3,641,114
2-LOWER ALKANOYLOXY-N-SULFONYL-BENZAMIDES

Scott J. Childress, Philadelphia, and J Lester Szabo, West Chester, Pa., assignors to American Home Products Corporation, New York, N.Y.
No Drawing. Filed June 3, 1969, Ser. No. 830,119
Int. Cl. C07c 143/06, 143/28, 143/40
U.S. Cl. 260—479 R    3 Claims

ABSTRACT OF THE DISCLOSURE

This invention concerns 2-carb(lower)acyloxy-N-sulfonylbenzamide derivatives thereof which have demonstrated pharmacological activity as central nervous system depressants and are also substantially non-irritating to the gastrointestinal tract upon oral administration.

---

The present invention relates to new and novel sulfonylamides. In particular, it is concerned with 2-carb-(lower)acyloxy-N-sulfonylbenzamides which is standard and accepted biological tests have demonstrated central nervous system depressant activity. Further, these compounds are substantially non-irritating to the gastrointestinal tract of animals upon oral ingestion.

The new and novel compounds of the present invention are exemplified by those having the formula:

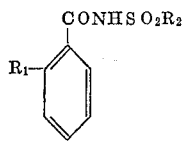

wherein $R_1$ is a carb(lower)acyloxy; and $R_2$ is selected from the group consisting of lower alkyl, phenyl, halophenyl, lower alkylphenyl, and lower alkoxyphenyl. As employed herein the terms "lower alkyl," "lower alkoxy" and the like are meant to include both branched and straight chain hydrocarbon groups having from one to about seven carbon atoms. The term "halogen" as used herein is meant to include: chlorine, bromine, fluorine and iodine. Typical examples of these compounds are: 2-acetoxy-N-methylsulfonylbenzamide; and 2-acetoxy-N-tosylbenzamide.

The new and novel compounds of the present invention may be prepared by the process which is exemplified by the following reaction scheme:

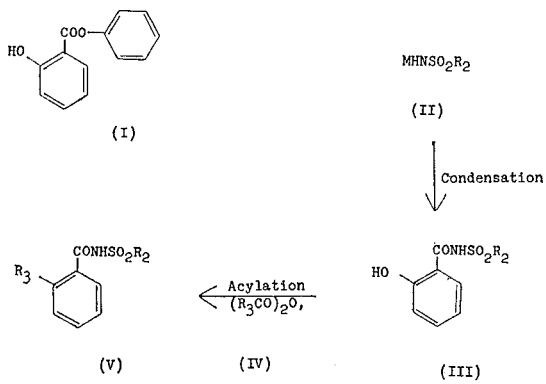

wherein $R_2$ is defined as above, $R_3$ is lower alkyl and M is an alkali metal. The condensation reaction is effected by contacting phenyl salicylate (I) with an appropriate alkali metal sulfonamide (II) at a temperature range from about 150° C. to about 180° C. for a period of about two to about four hours. When the condensation reaction is complete, the product is separated by standard recovery procedures. For example, the reaction mixture is admixed with a water-immiscible organic solvent e.g. benzene, washed with water, the water wash acidified and extracted with a water-immiscible, organic solvent e.g. benzene, the organic layer is then dried, filtered, evaporated and the residue crystallized from a suitable solvent e.g. toluene to afford a N-sulfonylsalicylamide (III).

The acylation reaction is effected by contacting an above-prepared N-sulfonylsalicylamide (III) with an appropriate carboxylic acid anhydride (IV) at about ambient temperatures for a period of about six to about twenty-four hours. When the acylation reaction is complete, the resulting product is obtained by conventional separation methods. For example, the reaction mixture is poured into ice, the dissolved ice extracted with a water-immiscible, organic solvent e.g. ethyl acetate, the organic solvent is then dried, filtered, evaporated and the residue recrystallized from an appropriate solvent e.g. toluene to yield a 2-carb(lower)acyloxy - N - sulfonylbenzamide (V). The starting materials (I and II) employed in the above-described process are commercially available or are readily prepared by well known chemical procedures.

The new and novel 2-carb(lower)acyloxy-N-sulfonylbenzamide (V) of the present invention possess valuable biological properties. In particular, these compounds (V) in standard pharmacological procedures demonstrate nervous system activity and are useful as depressants. Because of this property they have utility in producing a calming effect in mammals.

In the pharmacological evaluation of the central nervous system depressant compounds of this invention the in vivo effects of the compounds of this invention are tested as follows:

The compound is administered intraperitoneally to three mice (14 to 24 grams) at each of four different doses. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The new and novel 2-carb(lower)acyloxy-N-sulfonylbenzamides (V) of this invention in the above test procedure when administered intraperitoneally induce decreased motor activity and decreased respiration at a dose of about 127 mg./kilo of animal body weight. There were no deaths in the test animals at the highest intraperitoneal dose used, 400 mg./kilo.

A particularly useful property of the 2-carb(lower) acyloxy-N-sulfonylbenzamides (V) of this invention, is that, these compounds are substantially non-irritating to the gastrointestinal tract of animals when orally ingested.

When the compounds (V) of this invention are employed as central nervous system depressants they may be administered to mammals, e.g. mice, rats, rabbits, dogs, cats, monkeys, etc. alone or in combination with pharmacologically-acceptable carriers, the proportion of which is determined by the solubility and chemical nature of the compounds, chosen route of administration and standard biological practice. For example, they may be administered orally in the form containing such excipients as starch, milk sugar and so forth. They may also be administered orally in the form of solutions or they may be injected parenterally. For parenteral administration they may be used in the form of a sterile solution containing other solutes, for example, enough saline or glucose to make the solution isotonic.

The dosage of the present central nervous system depressants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration.

EXAMPLE I

A mixture of 5 grams of potassium methanesulfonamide and 25 g. of phenyl salicylate is heated with stirring for two and a half hours at 150–180° C. Thereafter, the reaction mixture is admixed with benzene and the solution washed with water. The aqueous wash is separated, acidified and extracted with benzene. The benzene layer is dried over magnesium sulfate, filtered and evaporated in vacuo yielding a nearly white solid, M.P. 122–123° C. The solid is dissolved in hot toluene and allowed to crystallize to give colorless needles of N-methylsulfonylsalicylamide, M.P. 123.5–124° C.

Analysis for $C_8H_9NO_4S$.—Calcd. (percent): C, 44.7; H, 4.22; N, 6.52. Found (percent): C, 44.98; H, 4.09; N, 6.58.

EXAMPLE II

Ten grams of N-methylsulfonylsalicylamide, as prepared in Example I, in 30 ml. acetic anhydride is stirred at room temperature for six and a half hours, allowed to stand overnight, and poured onto ice. The ice is allowed to melt, then extracted with ethyl acetate, the organic layer is washed with water, dried over $MgSO_4$, filtered and the solvent removed in vacuo. The residue is repeatedly triturated with cyclohexane giving a somewhat sticky solid. Recrystallization from hot toluene affords needles of 2-acetoxy-N-methylsulfonylbenzamide, M.P. 97.5–98.5° C.

Analysis for $C_{10}H_{11}NO_5S$.—Calcd. (percent): C, 46.8; H, 4.32; N, 5.45. Found (percent): C, 46.77; H, 4.25; N, 5.31.

EXAMPLE III

When the procedure of Example I is repeated to react phenyl salicylate with an appropriate sulfonamide the hereinafter listed sulfonylsalicylamides are prepared which are then reacted with an appropriate carboxylic acid anhydride to form the following 2-carb(lower)acyloxy-N-sulfonylbenzamides:

| Sulfonylsalicylamides | 2-carb(lower)acyloxy-N-benzamides |
|---|---|
| N-ethylsulfonylsalicylamide | 2-acetoxy-N-ethylsulfonylbenzamide. |
| N-phenylsulfonylsalicylamide | N-phenylsulfonyl-2-propionyloxybenzamide. |
| N-(p-chlorophenylsulfonyl)-salicylamide. | 2-butyryloxy-N-(p-chlorophenylsulfonyl)benzamide. |
| N-propylsulfonylsalicylamide | 2-acetoxy-N-propylsulfonylbenzamide. |
| N-tosylsalicylamide | 2-acetoxy-N-tosylbenzamide. |
| N-(p-bromophenylsulfonyl)-salicylamide. | N-(p-bromophenylsulfonyl)-2-pentanoyloxybenzamide. |
| Do | Do. |
| N-(m-iodophenylsulfonyl)-salicylamide. | 2-acetoxy-N-(m-iodophenylsulfonyl)benzamide. |
| N-(p-methoxyphenylsulfonyl)-salicylamide. | N-(p-methoxyphenylsulfonyl)-2-propionyloxybenzamide. |
| N-(o-fluorophenylsulfonyl)-salicylamide. | 2-acetoxy-N-(o-fluorophenylsulfonyl)benzamide. |
| N-(p-ethylphenylsulfonyl)-salicylamide. | 2-acetoxy-N-(p-ethylphenylsulfonyl)benzamide. |
| N-(p-propoxyphenylsulfonyl)-salicylamide. | 2-propionyloxy-N-(p-propoxyphenylsulfonyl)benzamide. |

What is claimed is:

1. A compound selected from the group having the formula:

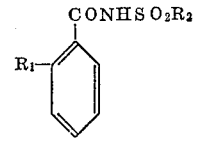

wherein $R_1$ is a lower alkanoyloxy; and $R_2$ is selected from the group consisting of lower alkyl, phenyl, halophenyl, lower alkylphenyl, and lower alkoxyphenyl.

2. A compound as described in claim 1 which is: 2-acetoxy-N-methylsulfonylbenzamide.

3. A compound as described in claim 1 which is: 2-acetoxy-N-tosylbenzamide.

References Cited

Chemical Abstracts, 58: p. 1410f.
Chem. Pharm. Bull., 1968, 16(5), 806–13.

JAMES A. PATTEN, Primary Examiner
V. GARNER, Assistant Examiner

U.S. Cl. X.R.

260—556 A, 556 AR; 424—311